United States Patent [19]

Erb

[11] 4,178,914

[45] Dec. 18, 1979

[54] HEADER FOR A SOLAR ENERGY COLLECTION SYSTEM

[75] Inventor: Robert A. Erb, Valley Forge, Pa.

[73] Assignee: The Franklin Institute, Philadelphia, Pa.

[21] Appl. No.: 930,797

[22] Filed: Aug. 3, 1978

Related U.S. Application Data

[63] Continuation-in-part of Ser. No. 645,648, Dec. 31, 1975, Pat. No. 4,114,597.

[51] Int. Cl.$^2$ .............................................. F24J 3/02
[52] U.S. Cl. .................................. 126/449; 126/417; 165/174; 237/1 A
[58] Field of Search .............. 126/271, 270; 237/1 A; 165/173, 174, 175

[56] References Cited

U.S. PATENT DOCUMENTS

| | | | |
|---|---|---|---|
| 367,516 | 8/1887 | Goubert | 165/174 |
| 1,743,989 | 1/1930 | Wainwright | 165/174 |
| 2,263,074 | 11/1941 | Dunham | 165/174 |
| 3,807,494 | 4/1974 | Ris | 165/174 |
| 3,859,980 | 1/1975 | Crawford | 126/271 |
| 3,934,323 | 1/1976 | Ford et al. | 126/271 |
| 3,991,742 | 11/1976 | Gerber | 126/271 |
| 4,018,215 | 4/1977 | Pei | 126/271 |
| 4,024,853 | 5/1977 | Gordon | 126/271 |
| 4,031,881 | 6/1977 | Thiel | 126/271 |
| 4,062,351 | 12/1977 | Hastwell | 126/271 |
| 4,062,352 | 12/1977 | Lesk | 126/271 |
| 4,063,547 | 12/1977 | Gruettner | 126/271 |
| 4,073,284 | 2/1978 | Laing | 126/271 |
| 4,073,285 | 2/1978 | Wendel | 126/271 |
| 4,081,966 | 4/1978 | De Geus | 126/271 |
| 4,102,328 | 7/1978 | Stiff | 126/271 |
| 4,112,566 | 9/1978 | DuBosque et al. | 126/271 |
| 4,129,119 | 12/1978 | Yoke | 126/271 |
| 4,136,272 | 1/1979 | Rudd | 126/271 |

FOREIGN PATENT DOCUMENTS

1485237 5/1967 France .................................. 52/309.1

Primary Examiner—Samuel Scott
Assistant Examiner—Daniel J. O'Connor
Attorney, Agent, or Firm—Weiser, Stapler & Spivak

[57] ABSTRACT

In a solar thermal energy collection system comprising at least one unitary, coextruded solar collector panel, having an upper, heat insulating region, and a lower, heat absorbing region, each region having channels extending longitudinally therethrough, adapted to contain a fluid therein, and a pair of headers, connected to the collector panel along an interface abutting the ends of the channels of the heat insulating region and the heat absorbing region, and connecting the collector panel to the remainder of the collection system, an improved header is provided; having a wall, which extends outward, initially tangentially, from a point along the interface which is substantially closest to the axial center of the header, and then along the interior of the wall of the header, forming a transitional channel which communicates with the second channels and which uniformly directs a fluid between the second channels and the central cavity defined by the header; and having an inner and outer wall, separating the cavity of the header from its exterior, and a plurality of ribs separating the inner and outer wall from each other, to form longitudinally extending channels which serve as heat insulating channels between the exterior of the header and the fluid circulating therein.

35 Claims, 9 Drawing Figures

HEADER FOR A SOLAR ENERGY COLLECTION SYSTEM

This application is a continuation-in-part of my co-pending application, Ser. No. 645,648, filed Dec. 31, 1975, now U.S. Pat. No. 4,114,597.

BACKGROUND OF THE INVENTION

This invention relates generally to the field of solar energy collection systems, and in particular to an improved header of increased efficiency for use in connection with such systems.

Recent realizations that alternative energy sources to fossil fuels must be developed have caused substantial efforts to be made in developing a commercially acceptable solar energy collection system. An essential component of any solar energy collection system being the solar collector panel, a substantial amount of effort has been expanded in the development of this element of the system. The headers used to connect such a collector panel to the remainder of the system are generally designed to properly complement the collector panel with which they are used.

Initial efforts to develop a useful solar collector panel often resulted in heavy, cumbersome structures involving the use of several, often incompatible, construction materials. This problem was particularly acute in the design of an acceptable flat plate type solar collector panel.

The flat plate type collector panel is generally more compatible with large structures, such as homes or offices, lending themselves well to the solar heating of air or water for use in the home or office, of water for distillation purposes, and even of water for use in heating a swimming pool. This compatability results from the existence on all buildings of large flat areas, such as the roof or walls, upon which such flat plate type collector panels may be mounted.

Although well suited for use in connection with a building, flat plate type collector panels had not yet found wide commercial acceptance for various reasons. Moreover, the cost of producing an efficient and workable collector panel often far outweighed its return, seriously limiting acceptance of such collectors by the public.

My patent application, Ser. No. 645,648, which is hereby incorporated by reference herein, discloses a flat plate type solar collector panel which serves to eliminate the above-mentioned drawbacks thus enabling production of a commercially acceptable solar thermal energy collection system. This is accomplished by providing a solar collector panel which is unitary in construction and which is capable of being produced in long, lightweight and continuous sections. In this manner entire portions of a structure may be covered with a series of such panels thereby enabling the conversion of sufficient amounts of solar thermal energy to provide for the heating needs of a consumer. Also disclosed is a header which is well adapted for use with such unitary collector panels.

The unitary collector panels disclosed are produced by coextruding a selected combination of synthetic thermoplastics into long panels having at least insulating and heat absorbing layers along their entire length. In this manner the previously required combination of construction materials is replaced by a single unit requiring no individual construction or separate parts. The resulting units are lightweight which permits their easy installation and also permits large surface areas of a structure to be completely utilized without requiring substantial shoring of the underlying structural members. The unit is also capable of being produced in large sizes and quantities, decreasing both the cost of such units as well as the costs of installation and labor. The headers used in connection with such collector panels may also be advantageously extruded in long, lightweight and continuous sections, thus providing similar advantages.

Although the above described unitary solar collector panels, and the headers adapted for use therewith, are well suited to solving the problems presented in converting solar energy into heat, it has been found that certain aspects of those components are capable of improvement, further enhancing the utility and potential for public acceptace of the resulting solar energy collection system.

On such aspect concerns the particular configuration of the header used in connection with such collector panels, and its effect on the efficiency of the over-all system.

For example, it has been found that heated fluid, passing through the header, exhibits a limited degree of heat loss, through the header to the outside elements. Moreover, fluid which is allowed to directly flow between the collector panel and the header has been found to exhibit a limited degree of turbulence, thereby reducing the efficiency of the over-all system. These losses may be reduced by suitably modifying the structure of the header.

Such a header configuration would also have applicability in connection with other types of collector panels as well.

SUMMARY OF THE INVENTION

This invention relates generally to the field of solar energy collection systems, and in particular to an improved header of increased efficiency for use in connection with a collector panel or panels comprising part of the collection system, such header being adapted to decrease heat loss from fluid circulating therethrough to the outside elements, and to improve the flow characteristics of the fluid as it flows between the collector panel or panels and the header.

In order to convert radiation from the sun into useful thermal solar energy, a building structure is provided with a plurality of coextruded unitary solar collector panels. First, the panels are affixed to the building using a plurality of battens particularly suited for such purpose. Next the collector panels are joined at each end by headers which are then connected to a circulating system capable of directing the converted solar energy produced toward a useful purpose.

In accordance with the present invention the header is provided with a fluid directing, transitional channel which communicates with the channels of the heat absorbing region of the collector panel, and which extends initially tangentially, from the edge of the collector panel, along the interior wall of the header, and into the central cavity of the header, the channel being defined by a lower wall which extends longitudinally within the header. In this manner, fluid flow is uniformly directed through the channel and therefore between the heat absorbing region of the collector panel and the central cavity of the header. By so directing the fluid flow, the turbulence and nonuniform distribution of fluid flow previously encountered in this area of the system is reduced.

Further, in accordance with the present invention, the header is provided with an inner and outer wall, both of which separate the cavity within the header from the exterior, and a plurality of ribs which separate the inner and outer walls of the header from each other, forming channels which extend longitudinally through the header. These channels are preferably filled with air, thereby forming a heat insulating region between the fluid contained within the header and the outside elements. In this manner, heat losses may be reduced.

Accordingly, it is an object of this invention to provide a header, for use in connection with a solar energy collection system, of increased efficiency.

It is another object of the present invention to provide a header, for use in connection with a solar energy collection system, which is capable of reducing heat loss from a fluid circulated therein to the outside elements.

It is another object of the present invention to provide a header, for use in connection with a solar energy collection system, having heat insulating channels which separate and insulate a fluid contained within the header from the outside elements.

It is another object of the present invention to provide a header, for use in connection with a solar energy collection system, which is capable of reducing the turbulence and non-uniform distribution of fluid flow encountered by a fluid flowing between the header and a collector panel to which it is attached.

It is another object of the present invention to provide a header, for use in connection with a solar energy collection system, which has a transitional channel which communicates with the channels of the heat absorbing region of the collector panel to which the header is attached, to direct a fluid therebetween and to thereby reduce turbulence and non-uniform flow distribution within the header.

It is another object of the present invention to provide a header, for use in connection with a solar energy collection system, which is compatible with a unitary, coextruded collector panel.

It is another object of the present invention to provide a header, for use in connection with a solar energy collection system, which is capable of manufacture in long, lightweight, continuous sections to thereby reduce the over-all cost of the energy collection system.

It is another object of the present invention to provide a header, for use in connection with a solar energy collection system, which is simple in design, inexpensive to manufacture, and easy to use.

These objects and others will become apparent to those skilled in the art from the following disclosure of the preferred embodiment of the invention taken in conjunction with the drawings provided in which like reference characters refer to similar parts throughout the several views provided, in which:

DESCRIPTION OF THE PEFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Figure 1:
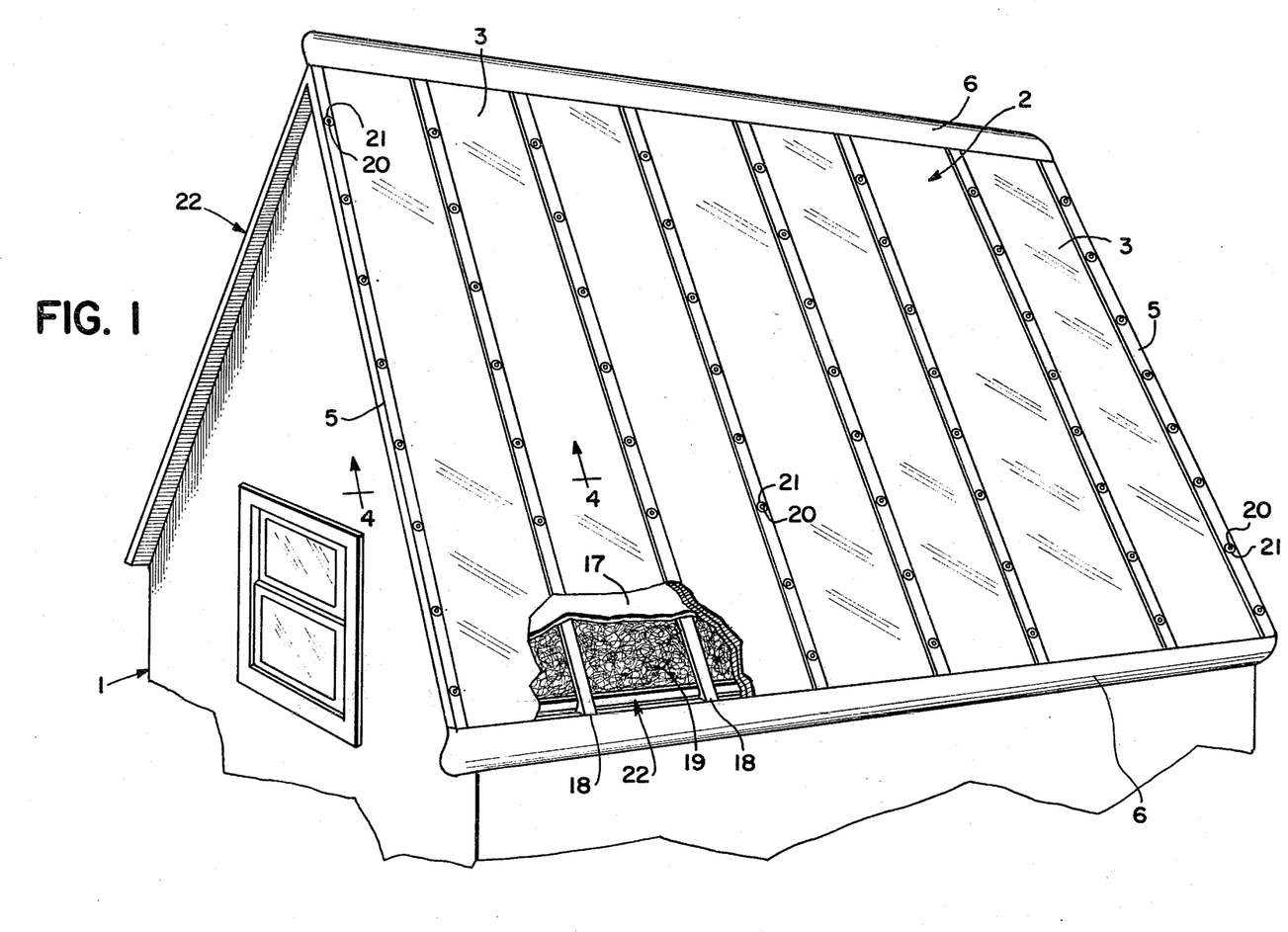
FIG. 1 is a perspective view of a structure which has been provided with a solar energy collector system, having a pair of headers and having collector panels which are in vertical, transverse alignment with the structure, and which is partially broken away to show interior construction details.
Figure 1A:
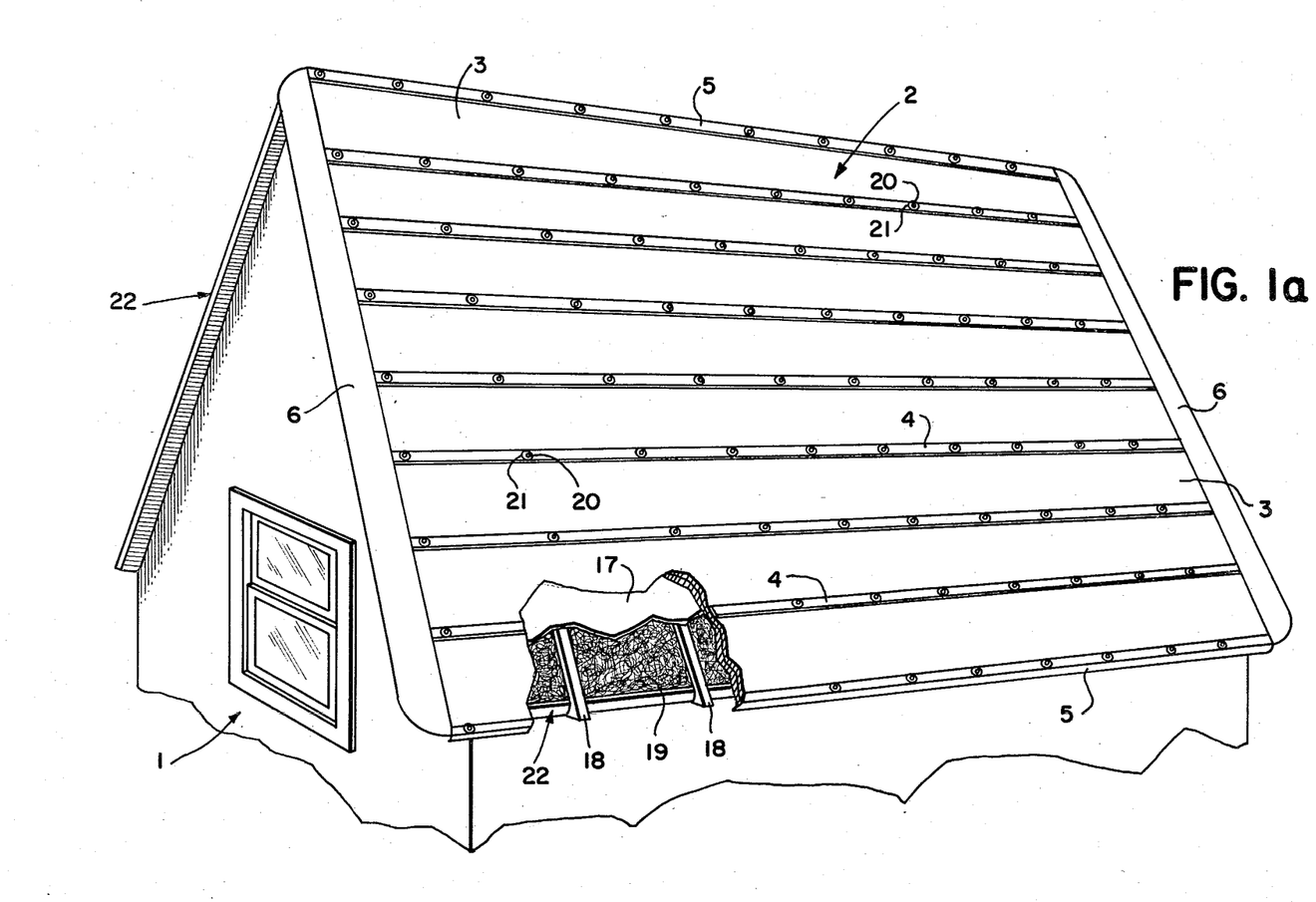
FIG. 1a is a perspective view of a structure which has been provided with a solar energy collector system, having a pair of headers, and having collector panels which are in horizontal, longitudinal alignment with the structure, and which is partially broken away to show interior construction details.

Referring now to the drawings, there is shown in FIG. 1 a building structure 1 which has been provided with a solar energy collector system 2. The solar energy collector system 2 comprises a plurality of flat plate-type solar collector panels 3 which are affixed to the structure 1 using a plurality of battens 4, 5, and a pair of headers 6 attached to the ends of the collector panels 3.

The solar collector panels 3 would be generally of the type disclosed in my patent application, Ser. No. 645,648; a unitary coextruded panel formed of synthetic thermoplastic, having a heat insulating region 7 and a heat absorbing region 8.

Each solar collector panel 3 is provided with a heat insulating region 7 and a heat absorbing region 8. The heat insulating region 7 would be transparent and thus capable of transmitting therethrough the major part of solar spectral radiation. The heat absorbing region 8 would be opaque, black or dark and thus capable of absorbing solar radiation passed through the heat insulating region 7.

Figure 2:
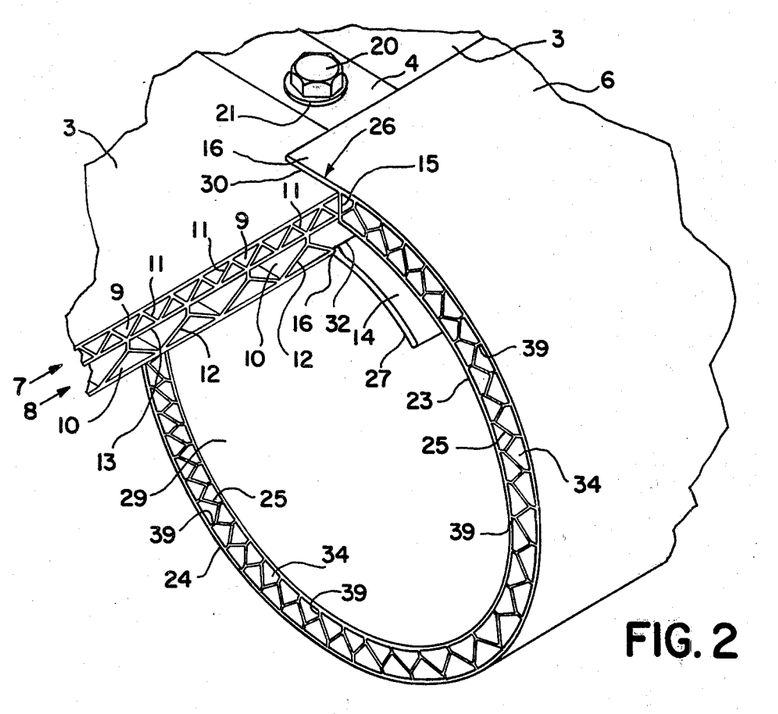
FIG. 2 is an enlarged, partial, sectional view of the interface between the collector panels, the panel mounting batten and the header.

As illustrated in FIG. 2 each solar collector panel 3 is provided with a plurality of longitudinally extending channels 9, 10 defined by ribs 11, 12. The heat insulating region 7 and the heat absorbing region 8 are separated from each other by a longitudinally extending divider 13. Various fluids may then be provided within the channels 9, 10 to utilize the solar thermal energy absorbed by the collector panels 3. For example, the heat insulating region 7 would generally be provided with air. By sealing the ends of the channels 9 forming the heat insulating region 7 the air is prevented from circulating, thereby forming an insulating layer between the heat absorbing region 8 and the outside elements. The heat absorbing region 8 would generally be provided with a fluid such as air, a silicone fluid, water or a water-ethylene glycol mixture, which is then circulated through the channels 10 of the heat absorbing region 8, thereby heating the fluid, which would then be carried away for use with the remainder of the system (not shown). Of course, it is to be understood that any one of several known fluids could be utilized in connection with either the heat insulating region 7 or the heat absorbing region 8 depending upon the particular application involved.

Each end of the solar collector panel 3 would be provided with a header 6 to permit connection of the collector panel 3 to the remainder of the heating system. The headers 6 are preferably manufactured in a manner similar to that of the collector panels 3, by extrusion of a synthetic thermoplastic. Extrusion permits formation of the headers 6 as long, unitary structures which may quickly and easily be attached to the collector panels 3 along the entire length of the interface between those elements.

As illustrated in FIG. 2 the header is preferably, essentially circular in cross-section, although headers of other shapes may also be produced, and is provided with a transitional channel 14, a fluid blocking member 15 and a means for connecting the header 6 to the solar collector panel 3. The fluid blocking member 15 is provided to prevent the fluid contained within the heat insulating region 7 from circulating, thus providing insulation between the heat absorbing region 8 and the outside elements. The transitional channel 14 is adapted to communicate with the channels 10 of the heat absorbing region 8 in a manner which improves the uniformity of flow of the fluid between the channels 10 and the header 6, as will be described below in greater detail. As a means for connecting the header 6 to the solar panels 3, the header 6 illustrated is provided with upper and lower brackets 16 which are adapted to overfit the collector panels 3. The header 6 may be connected to the collector panels 3 either frictionally, by use of a suitable bonding method, e.g. one and two component elastomeric sealants, epoxy or acrylic thermosetting systems, solvent bonding, ultasonic bonding, thermal bonding, etc., or by use of a mechanical means, e.g. blind rivets. In this manner, the header 6 may be readily connected to one or more collector panels 3 as desired. Both fixed and detachable connection of the header 6 to the collector panels 3 are possible, providing either a permanent installation or, if desired, a semipermanent, detachable installation.

The solar collector panels 3 are affixed to the structure 1 using a plurality of battens; either battens 4 which are used to affix adjacent panels 3 to each other and to the structure 1, or end battends 5 used to affix the outer edges of the outermost panels 3 to the structure 1 and to seal the edges of the roof 22 of the structure 1 from the outside elements.

As illustrated in FIG. 1, the solar collector panels 3 are preferably applied to the structure 1 over a substrate 17 formed of plywood, or other sheet material, which may be conventionally applied to the rafters 18 of the roof 22 prior to installation of the collector panels 3. Insulation 19 may be applied beneath the substrate 17 and between the rafters 18 in known fashion. The solar collector panels 3 may then be placed over the substrate 17 in juxtaposed relationship and retained in place by the battens 4, 5, which are adapted to engage the collector panels 3 along their edges and retain them to the roof 22 of the structure 1. The battens 4, 5 may be attached to the substrate 17 and/or the rafters 18 using any of several fastening means, for example, nails, screws or the bolts 20 illustrated, placed at multiple locations along the battens 4, 5. Although not required, it is preferred that the fastening means be equally spaced along the batten 4, 5. The bolts 20 may be provided with flexible washers 21 in order to absorb some of the stress produced when the bolts 20 are tightened and to prevent water leakage or seepage around the bolts 20. In this manner the collector panels 3 are securely mounted to the roof 22 of the structure 1.

Each solar collector panel 3 would advantageously be on the order of 16 inches in width and would be of a length appropriate to cover the entire length or width of a structure (e.g. 15-20 feet). A width of 16 inches is advantageous in that many structures are provided with rafters 15 having 16 inch centers. Thus a collector panel 3 may be placed between and firmly attached to a pair of rafters 15. Of course, other widths are equally possible. Many homes presently have rafters 15 placed at 24 inch intervals. Collector panels having 24 inch widths would be appropriate in such cases. Although preferred, a one to one correspondence between rafter centers and collector panel width is not required, and collector panels 3 having any appropriate width may be utilized, if desired.

Collector panels 3 of the type above described are readily produced by the extrusion process, having widths preferably on the order of one to two feet. Such panels may be produced in long sections, the length generally being limited only by convenience and bulk. Fifteen foot sections have been found useful in many applications, however other lengths are clearly possible. Several such panels 3 may be laid adjacent to each other upon the roof 22 of the building structure 1, thereby enabling the complete coverage and usage of existing space.

After affixing the collector panels 3 to the roof 22 the headers 6 may be attached to the ends of the collector panels 3. The headers 6 may then be connected to the remainder of the circulatory system as desired.

The above discussion illustrates a solar collector system 2 capable of being affixed to a building structure 1 and of transferring solar thermal energy collected by the system 2 to the structure 1 in the form of heat energy. The headers 6 which connect the collector panels 3 to the remainder of the system (not shown) will now be described in greater detail.

Figure 3:
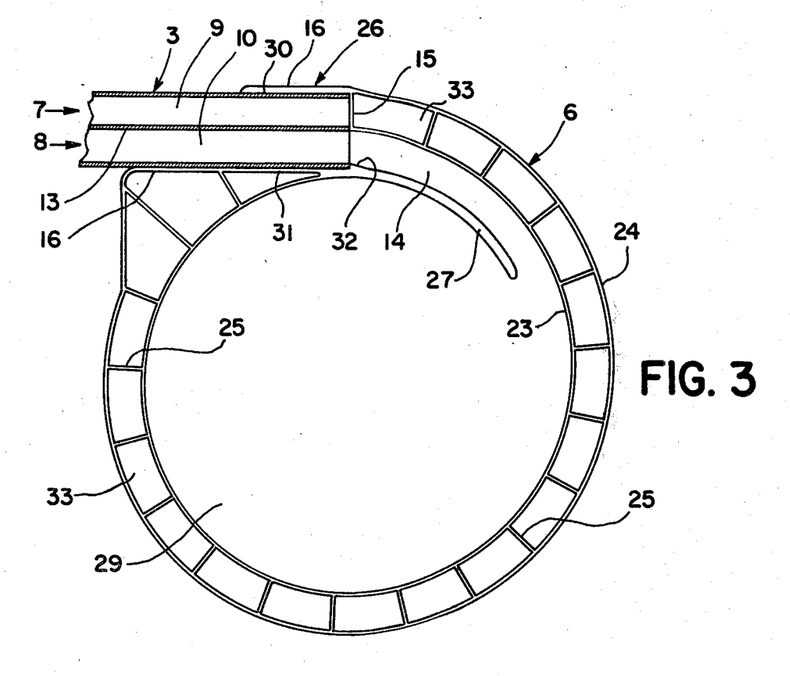
FIG. 3 is a cross-sectional view of a first embodiment of the header, illustrating the transitional channel and the heat insulating channels.

FIG. 3 illustrates a first embodiment of a header 6 of improved construction. The header 6 comprises an inner wall 23 and an outer wall 24, which are separated from each other by a plurality of ribs 25, a collector panel engaging portion 26 adapted to engage and retain in place an abutting end of a collector panel 3, and an inner segment or wall 27 which defines a fluid directing, transitional channel 14 which communicates with the central cavity 29 of the header 6.

The collector engaging portion 26 is provided with an upper lip 30 and a lower supportive portion 31 which combine to engage the collector panel 3. By properly dimensioning the upper lip 30 and lower portion 31, a collector panel 3 may be slidingly engaged by the collector engaging portion 26 and thereby retained in place. If desired, a suitable bonding method, or mechanical fasteners, may be used to retain the collector panel 3 to the header 6.

Also provided as part of the collector engaging portion 26 is a fluid blocking member 15. The element serves two functions. First, preferably in combination with a lower stop 32, the fluid blocking member 15 serves to limit insertion of the collector panel 3 into the collector engaging portion 26. In this manner, a person assembling the system may be assured of proper alignment during assembly, even though unskilled in the art of solar collector systems. Second, the fluid blocking member 15 serves to prevent a fluid found within the channels 9 of the heat insulaing region 7 from exiting that region. In this manner the fluid within the channels 9 insulates heat absorbed by the heat absorbing region 8 from the outside elements.

The wall 27, which serves to form the fluid directing channel 14 illustrated, extends outward, initially tangentially, from the lower supportive portion 31, and then along, and spaced away from, the inner wall 23, subsequently opening out into the cavity 29 of the header 6. It is preferred that the wall 27 extend from a point along the interface between the header 6 and the collector panel 3 which is closest to the axial center of the header 6, so as to permit the channel 14 to freely communicate with the channels 10 of the heat absorbing region 8. It is also preferable, although not required, that the wall 27 extend along the inner wall 23 spaced at a fixed distance away from the inner wall 23. If so, the height of the transitional channel 14 would essentially equal the height of the heat absorbing region 8, providing for uniform communication between the channels 10 and the cavity 29.

By properly inserting the collector panel 3 within the collector engaging portion 26, the channels 10 of the heat absorbing region 8 are placed in communication with the channel 14 defined between the inner wall 23 and the lower wall 27. The channel 14 is thereby capable of accepting a fluid flowing between the channels 10 of the heat absorbing region 8 and the cavity 29 of the header 6. Interposition of such a channel 14 between the collector panel 3 and the cavity 29 has been found to reduce the turbulence previously encountered at that interface by uniformly directing the fluid between the channels 10 and the cavity 29. Reducing such turbulence increases the efficiency of the fluid flow through the collector panels 3 and the headers 6, thereby improving heat exchange between those elements and the remainder of the system.

The outer wall 24 and the inner wall 23 of the header 6 are separated by a plurality of ribs 25 connected between the walls 23,24, thus forming a plurality of channels 33 which longitudinally extend through the header 6. These channels 33 would generally be filled with air, although other fluids could be used as well, and capped at each end of the header 6. The channels 33 may also be filled with various solid insulating materials, e.g. formed-in-place polymer foam, expanded plastic beads, and expanded vermiculite. In this manner a plurality of heat insulating channells 33 are formed which reduce heat loss from the fluid circulating within the cavity 29 to the outside elements, in a manner similar in nature to the heat insulating region 7 of the collector panel 3.

In the configuration shown, the ribs 25 are essentially perpendicular to the inner and outer walls 23,24, thus forming essentially rectangular insulating channels 33. As will be shown below, other rib configurations may also be used.

Consequently, the above mentioned header 6 is capable of performing its fluid directing function in a manner which improves fluid flow therethrough and reduces heat loss to the outside elements.

Figure 4:
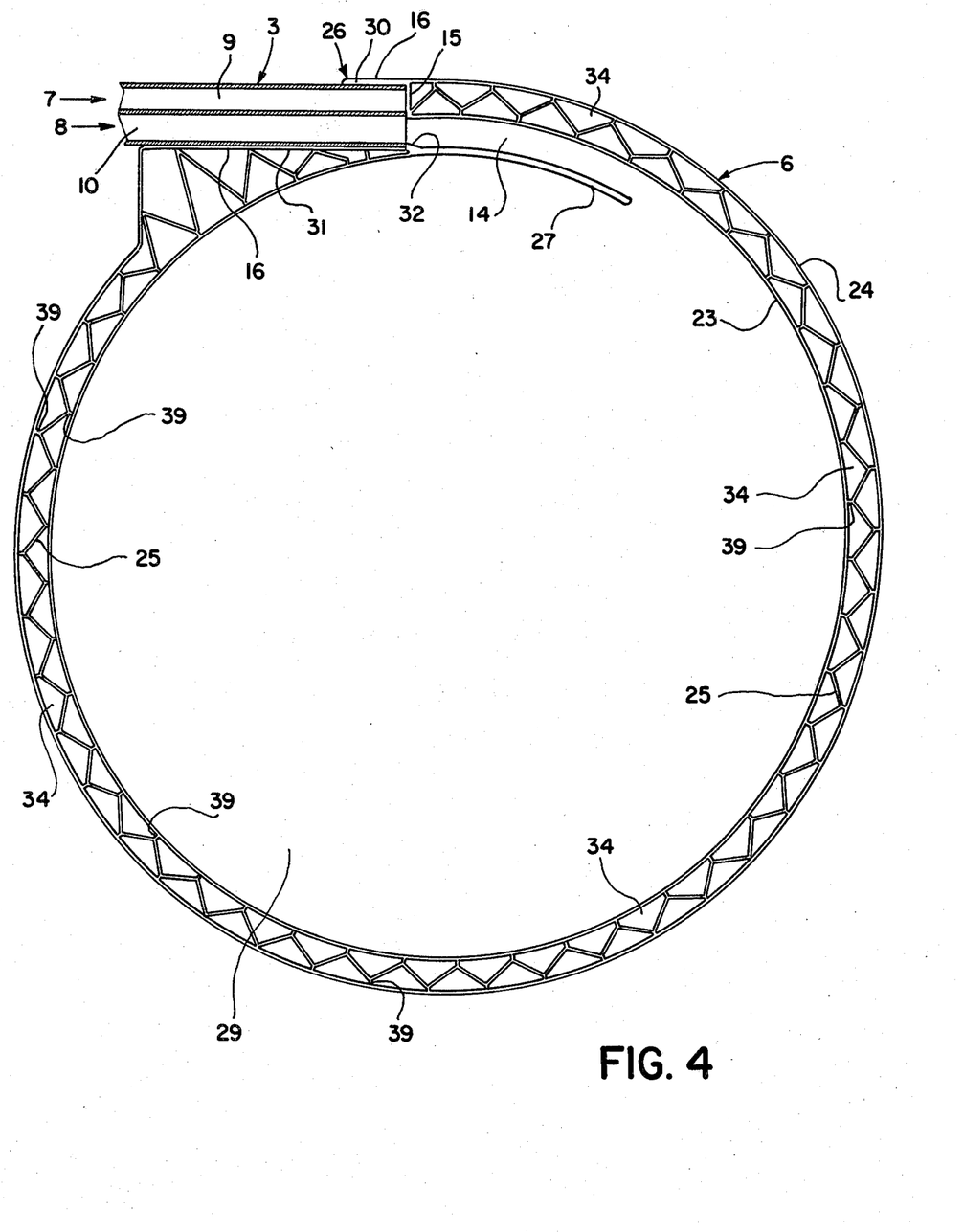
FIG. 4 is a cross-sectional view of a second, preferred embodiment of the header, illustrating the transitional channel and the heat insulating channels.

FIG. 4 illustrates a second, preferred embodiment of a header 6 of improved construction. The header 6 illustrated is similar in most respects to that illustrated in FIG. 3, having a collector engaging portion 26 and a transitional channel 14 which operate as previously described. However, in FIG. 4 it will be noted that the ribs 25 separating the outer wall 24 from the inner wall 23 are oblique, rather than perpendicular to the walls 23,24. Each end of the oblique ribs 25 is preferably retained away from the walls 23,24 by a bridging segment 39, however this segment 39 is not required. Oblique ribs 25 are combined to form essentially triangular channels 34 as shown. The triangular channels 34 combine to form two sets of channels 34, one in which the bases of the triangles face inwardly, and the other in which the bases of the triangles face outwardly. In this manner the walls 23,24 are essentially separated by two groups of insulating channels, one atop the other, thereby increasing insulation in that area. This improved insulation is provided even though little additional material is required, and therefore little additional cost or weight is involved. Although the ribs 25 illustrated form triangular channels 34, it is also possible to provide ribs 25 having other angular inclinations, or curvatures, forming channels of other configurtions.

Figure 5:
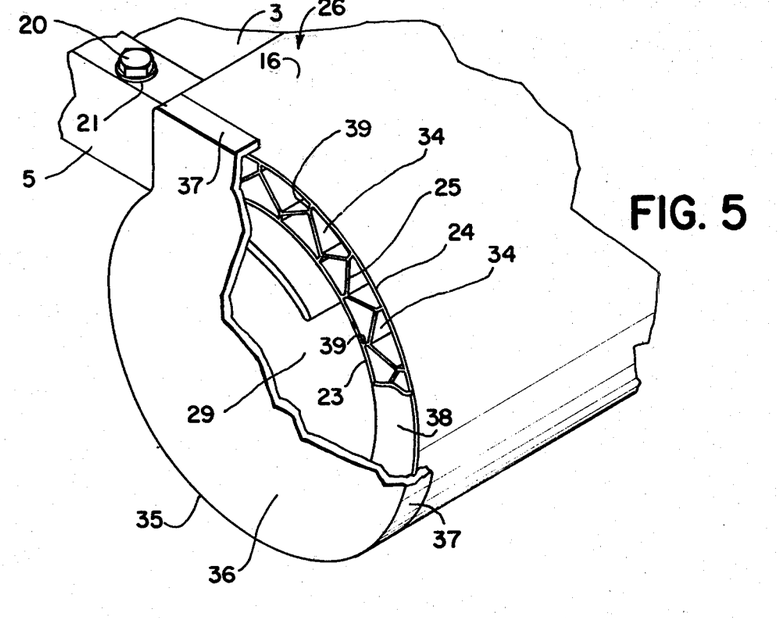
FIG. 5 is an isometric, partially sectional view of the header and a collector panel showing a cap used to seal the end of the header.
Figures 6, 7:
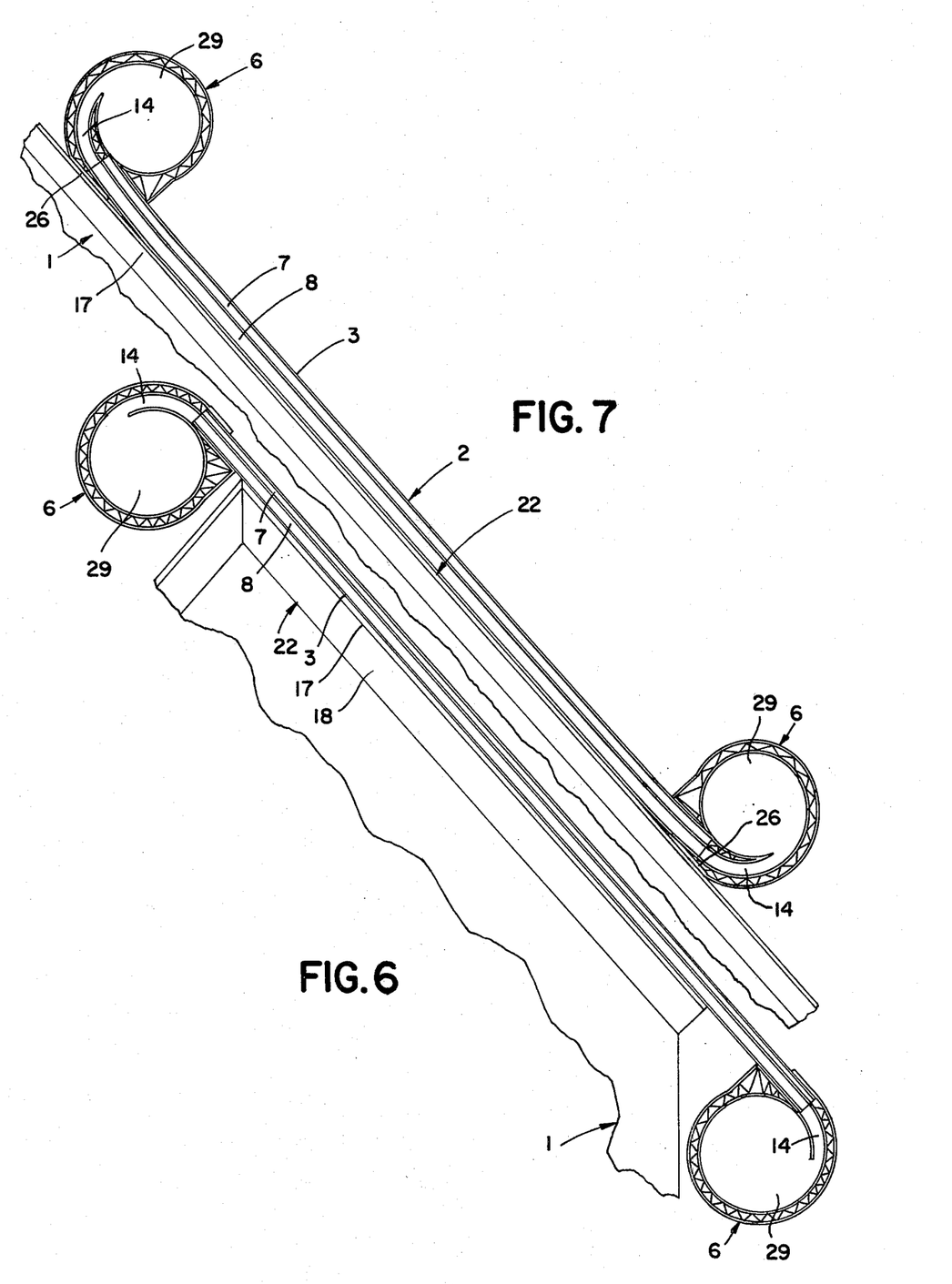
FIG. 6 is a cross-sectional view of the solar energy collector system of FIG. 1.
FIG. 7 is a cross-sectional view of the solar energy collector system of FIG. 1, but showing use of a header of modified construction.

The headers 6 illustrated in FIG. 5 and FIG. 6 are well suited to manufacture by the extrusion process. In this manner long, lightweight and continuous headers 6 of the construction above described may be formed. Such headers 6 are easy to install and use, and are capable of being manufactured at competitive market prices. The headers 6 would preferably be extruded from a synthetic thermoplastic, which may be either the same as or different from that used to form the collector panels 3, although other materials and manufacturing methods could also be used.

Extrusion of the header 6 would leave it with open ends. Consequently, after being cut to size, each end must be appropriately sealed to both maintain a fluid within the cavity 29 and to separately maintain a fluid within the insulating channels 34. This may be accomplished, for example, using the cap 35 illustrated in FIG. 5. The cap 35 has a fluid blocking central section 36 which may be directly connected to the exposed end of the header 6, providing the desired fluid seal. It is also possible to provide the cap 35 with a lip 37 which extends around the perimeter of the central section 36. The lip 37 would be capable of engaging the outer wall 24 of the header 6, and would assist in connecting the cap 35 to the end of the header 6. To provide additional isolation between the cavity 29 and heat insulating channels 34 an annular sealing ring 38, preferably formed of an elastomer, may be placed over the ends of the channels 34 before the cap 35 is placed over the end of the header 6. A suitable outlet (not shown) would be provided through the cap 35 sealing one end of the header 6 to enable connection of the solar collector system 2 to the remainder of the system (not shown).

The foregoing describes an inproved header 6 which is suitable for efficiently connecting a collector panel 3, or a group of such collector panels 3, to the remainder of a solar energy collection system. Headers 6 having other configurations may also be used to obtain similar results.

For example, the headers 6 illustrated in FIG. 3 and FIG. 4 are essentially circular in cross section. It is also possible to utilize other shapes. For example, the headers 6 may be elliptical in cross section if desired, or they may be rectangular in cross-section, depending upon the design requirements determined by the nature of the system and the fluid it is designed to carry. A wide variety of shapes are possible.

In addition, although it is preferred that the header 6 have both a transitional channel 14 and heat insulating channels 33,34 to provide the best possible result, it is also possible to produce a header 6 having only a transitional channel 14, or heat insulating channels 33,34.

Further, FIG. 1 illustrates collector panels 3 which extend vertically along the roof 22 of the building 1, the headers 6 extending horizontally along the top and bottom of the roof 22. It is also possible for the collector panels 3 to extend horizontally along the roof 22 of the building 1, the headers 6 extending vertically along the edges of the roof 22, although such placement is less desirable since there arises a potential for water to collect along the seams between the collector panels 3 and battens 4,5, and thus seep through the seams to the roof 22 below. In fact, it is also possible to place such collector panels 3 on a wall of the building 1, or any structural section which is capable of supporting a large flat structure such as that illustrated in FIG. 1.

FIG. 6 illustrates, in cross section, a collector panel 3 affixed in vertical orientation to the roof 22, as illustrated in FIG. 1. The headers 6 would extend along the upper and lower edges of the roof 22. Support for the collector panel 3 is provided by the rafters 18 and substrate 17 illustrated.

Figure 8:
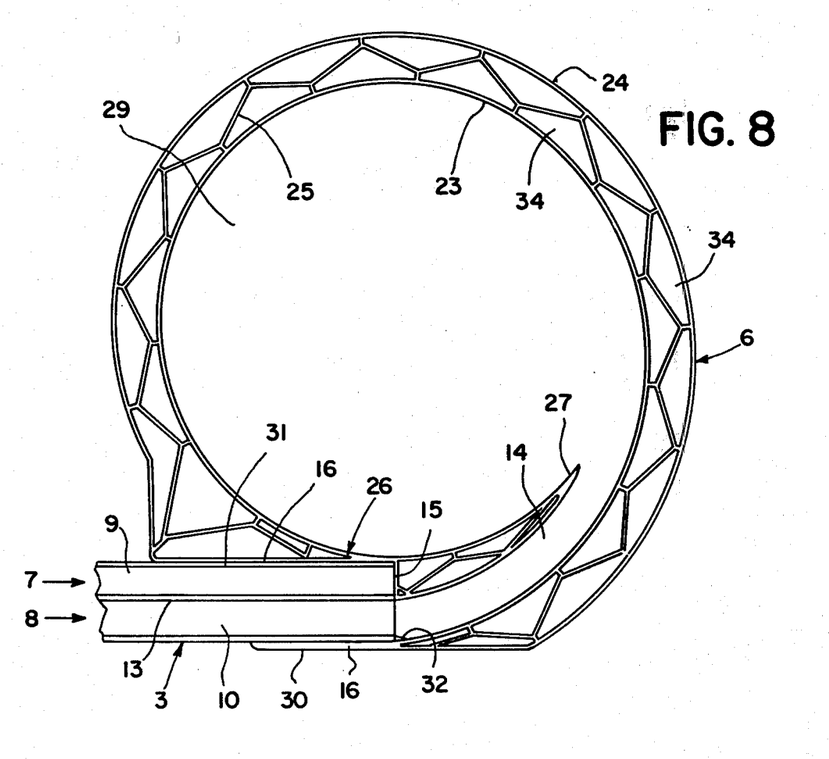
FIG. 8 is a cross-sectional view of the header used in connection with the solar energy collector system illustrated in FIG. 7.

In FIG. 6 the headers 6 are adapted to extend essentially beneath the collector panel 3 at both ends. In some cases it may be preferable not to position the header 6 beyond the edge of the roof 22, or some other supporting structure. In such cases it may be preferable to place the headers 6 in a position essentially raised from the collector panel 3 to permit the mounting of a collector system 2 on any area of a supporting structure. An example of such a system is illustrated in FIG. 7. A header 6 capable of use in connection with such a system is illustrated in FIG. 8. Such a header 6 is essentially similar to tht illustrated in FIG. 4, modified only to accommodate the reversed positioning of the header with respect to the heat insulating region 7 and the heat absorbing region 8 of the collector panel 3. To further improve upon the versatility in mounting arrangements, combinations of the header of FIG. 4 and that of FIG. 7 may be used if desired.

Although the aiove improvements have been discussed in connection with a unitary type solar collector panel, it is equally possible to utilize similar improvements in connection with other, conventional collector panels, such as solar collector panels which are constructed from a plurality of separate components, whether formed of plastic, glass or some other combination of materials. Such improvements may also be used in connection with modular design solar panels, an example of this type of construction being the modular panel produced by the Williams Research Co., illustrated in Design News, January 9, 1978 at page 22.

It may therefore be seen that the above disclosed invention serves well to accomplish the objects previously stated. It may also be seen that the above described invention may be embodied in other specific forms in addition to those above disclosed and therefore the disclosure made should be interpreted in an illustrative and not a limiting sense.

What is claimed is:

1. In a solar thermal energy collection system comprising at least one solar collector panel, capable of being affixed to a structure, the collector panel having an upper, heat insulating region comprising first channels longitudinally extending therethrough which contain a first fluid therein, and a lower, heat absorbing region comprising second channels longitudinally extending therethrough which contain a second fluid therein, and at least one header, connected to the collector panel along an interface abutting the first and second channels, and connecting the collector panel to the remainder of the energy collection system, an improved header which comprises:

a wall which extends outward, initially tangentially, from a point along the interface between the collector panel and the header which is substantially closest to the axial center of the header, and then along, and spaced away from, the interior of the wall of the header, to form a transitional channel which communicates with the second channels and which opens into the central cavity of the header, whereby the flow of the second fluid is uniformly directed between the second channels and the cavity of the header, thereby contributing to the uniform distribution of fluid flow, and the reduction of turbulence, between the second channels of the collector panel and the cavity of the header.

2. The energy collection system of claim 1 wherein the means for connecting the header to the collector panel comprises a pair of opposing brackets, connected at the top and bottom of the interface between the collector panel and the header, and adapted to slidingly engage the end of the collector panel.

3. The energy collection system of claim 2 wherein the wall extends outward from the bracket, of the pair of opposing brackets, which is closest to the axial center of the header.

4. The energy collection system of claim 1 wherein the wall forming the transitional channel extends along the inner wall of the header at a uniform distance away from the inner wall along the entire length of the wall forming the transitional channel.

5. The energy collection system of claim 1 wherein the wall extends longitudinally through the header.

6. The energy collection system of claim 1 wherein the distance between the wall forming the transitional channel and the inner wall of the header, at the point where the transitional channel communicates with the cavity of the header, is substantially equal to the height of the heat absorbing region.

7. In a solar thermal energy collection system comprising at least one solar collector panel, capable of being affixed to a structure, the collector panel having an upper, heat insulating region comprising first channels longitudinally extending therethrough which contain a first fluid therein, and a lower, heat absorbing region comprising second channels longitudinally extending therethrough which contain a second fluid therein, and at least one header, connected to the collector panel along an interface abutting the first and second channels, and connecting the collector panel to the remainder of the energy collection system, an improved header which comprises:

an inner and an outer wall, separating the interior cavity defined by the header from the exterior of the header, and a plurality of ribs, connected between the inner and outer wall, which separate the inner and outer wall from each other.

8. The energy collection system of claim 7 wherein the ribs extend longitudinally along the header to define a plurality of channels.

9. The energy collection system of claim 8 wherein the ribs are substantially perpendicular to the inner and outer walls of the header.

10. The energy collection system of claim 9 wherein the ribs combine to form essentially rectangular channels.

11. The energy collection system of claim 8 wherein the ribs are obliquely oriented with respect to the inner and outer walls of the header.

12. The energy collection system of claim 11 wherein the obliquely oriented ribs combine to form essentially triangular channels.

13. The energy collection system of claim 12 wherein the obliquely oriented ribs combine to form two groups of opposing, essentially triangular channels, the bases of the triangles of one group of channels corresponding to the inner wall of the header, and the bases of the triangles of the other group of channels corresponding to the outer wall of the header.

14. The energy collection system of claim 13 wherein both groups of triangular channels are essentially equal in cross-sectional area.

15. The energy collection system of claim 12 wherein the apex of the triangular channel is separated from the inner or outer wall of the header by a bridging segment connected between the apex of the triangular channel and the inner or outer wall.

16. The energy collection system of claim 15 wherein the bridging segment is substantially linear.

17. The energy collection system of claim 15 wherein the bridging segment is substantially perpendicular to the inner or outer wall of the header.

18. The energy collection system of claim 1 or 7 wherein the header is extruded.

19. The energy collection system of claim 8 wherein the channels are filled with a solid insulating material.

20. The energy collection system of claim 8 which further comprises an annular sealing ring which extends over the end of the space defined between the inner and outer walls of the header and which also corresponds to an end of the header, thereby sealing the channels closed.

21. The energy collection system of claim 20 wherein the annular ring is formed of an elastomer.

22. The energy collection system of claim 1, 7 or 20 which further comprises a cap, capable of sealing an open end of the header, placed over the end of the header, the perimeter of the cap being configured to correspond to the cross sectional perimeter of the header.

23. The energy collection system of claim 22 wherein the cap is bonded to the end of the header.

24. The energy collection system of claim 22 wherein the cap has means for connecting the cap to the header, the connecting means being positioned around the perimeter of the cap and being adapted to engage the header along the perimeter of an end of the header.

25. The energy collection system of claim 22 wherein the cap has means for connecting the header to the remainder of the energy collection system.

26. The energy collection system of claim 7 which further comprises a wall which extends outward, initially tangentially, from a point along the interface between the collector panel and the header which is substantially closest to the axial center of the header, and then along, and spaced away from, the interior wall of the header, forming a transitional channel which communicates with the second channels of the collector panel and which opens into the central cavity of the header.

27. The energy collection system of claim 26 wherein the ribs, and the inner and outer walls of the header, and the wall forming the transitional channel, extend longitudinally through the header.

28. The energy collection system of claim 1, 7 or 26 wherein the solar collector panel is unitary in construction.

29. The energy collection system of claim 28 wherein the solar collector panel is coextruded.

30. The energy collection system of claim 1, 7 or 26 in combination with a unitary coextruded solar collector panel having a first, heat insulating region, divided into a plurality of first channels by a plurality of first ribs extending from the top of the heat insulating region to the bottom thereof, and a second, heat absorbing region, divided into a plurality of second channels by a plurality of second ribs extending from the top of the heat absorbing region to the bottom thereof, wherein the second region is adapted to absorb heat produced by solar radiation impinging thereupon, and the first region is adapted to insulate the second region to prevent the heat absorbed by the second region from being lost to the external elements.

31. The energy collection system of claim 30 wherein the header has a fluid blocking member, which extends along the interface between the header and the first channels of the collector panel, which seals and encloses the ends of the first channels of the heat absorbing region when the collector panel is engaged by the header.

32. The energy collection system of claim 30 wherein the header extends essentially below the collector panel.

33. The energy collection system of claim 30 wherein the header extends essentially above the collector panel.

34. The energy collection system of claim 30 having a pair of headers, one at each opposing end of the collector panel.

35. The energy collection system of claim 34 wherein one of the pair of headers extends essentially below the collector panel and the other of the pair of headers extends essentially above the collector panel.

* * * * *